US006421005B1

(12) United States Patent
Weaver et al.

(10) Patent No.: US 6,421,005 B1
(45) Date of Patent: Jul. 16, 2002

(54) ADAPTIVE ANTENNA SYSTEM AND METHOD

(75) Inventors: Carl Francis Weaver, Morris Plains; Xiao Cheng Wu, Parsippany, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/635,134

(22) Filed: Aug. 9, 2000

(51) Int. Cl.[7] .................................................. H04B 7/00

(52) U.S. Cl. .......................... 342/367; 342/81; 342/373

(58) Field of Search .......................... 342/81, 154, 367, 342/372, 373; 343/767, 768, 769

(56) References Cited

U.S. PATENT DOCUMENTS

| | | | | |
|---|---|---|---|---|
| 3,697,994 A | * | 10/1972 | O'Daniel | 343/16 R |
| 3,816,830 A | * | 6/1974 | Giannini | 343/100 SA |
| 5,086,302 A | * | 2/1992 | Miller | 342/373 |
| 5,264,863 A | * | 11/1993 | Miner et al. | 343/881 |
| 5,276,907 A | | 1/1994 | Meidan | |
| 5,430,453 A | * | 7/1995 | Rudish et al. | 342/373 |
| 5,805,996 A | | 9/1998 | Salmela | |
| 5,889,494 A | | 3/1999 | Reudink et al. | |
| 5,966,094 A | | 10/1999 | Ward et al. | |
| 6,011,520 A | * | 1/2000 | Howell et al. | 343/769 |
| 6,067,055 A | * | 5/2000 | Vaidyanathan | 343/844 |
| 6,094,166 A | | 7/2000 | Martek et al. | |

FOREIGN PATENT DOCUMENTS

| | | |
|---|---|---|
| EP | 0 777 400 A2 | 6/1997 |
| WO | 98/39851 | 9/1998 |

OTHER PUBLICATIONS

"Antenna Downtilt Effects on DCMA Cell–Site Capacity", Scott C. Bundy, *IEEE*, pp. 99–102, 1999.

* cited by examiner

*Primary Examiner*—Dao Phan
(74) *Attorney, Agent, or Firm*—Harness, Dickey & Pierce, P.L.C.

(57) ABSTRACT

A system and method have been developed wherein a cylindrical antenna array is configured and reconfigured in a wireless communication network. Position and signal information are continuously received from wireless mobile units and are used to determine reconfigurations of antenna components of the cylindrical antenna array to enhance performance of the system. As such, base station antennas are dynamically configured to minimize such things as interference and dropped calls, and to maximize their voice quality both within a cell, and among neighboring cells.

41 Claims, 5 Drawing Sheets

ADAPTIVE ANTENNA SYSTEM AND METHOD

BACKGROUND OF THE INVENTION

1. Field of the Invention

The invention is generally directed to antennas and their use in wireless communication.

2. Description of Related Art

Wireless communication systems typically involve information from individual wireless or landline callers being sent to and from other wireless or landline callers via base stations and wireless communication switching centers. Each base station typically includes three antennas, or a single three component antenna 20 as shown in prior art FIG. 1 (which is most times a 3 pole or 3 component antenna as represented by element 20A, 20B and 20C). The coverage area or cell 10 serviced by the base station antenna 20 varies in size, depending upon the strength or power of the antenna; the distance between base station antennas 20; and other various parameters.

Base station antenna 20 typically includes three antenna components 20A, 20B and 20C, each component being set up and remaining in a fixed position. Each of the three antenna components 20A, 20B and 20C provides a fixed beam pattern and orientation covering a fixed sector such as that shown in FIG. 1, and represented by elements 30A, 30B and 30C. The beam patterns 30A–C as shown in FIG. 1 dictate the area or sector from which information can be received from wireless communication units and to which information can be sent.

When configuring a wireless communication network, base station antennas 20 must be deployed in a manner which adequately services the wireless network. Each antenna must adequately cover its corresponding cell or area to minimize calls being dropped and to maximize the number of calls which the antenna and network can handle. A major problem in a deployment of a wireless system, such as a cellular/PCS system, lies in the deployment of base stations and their antennas, and evaluating and tuning the performance of the entire system so as to minimize dropped calls, failed acceptances of newly originated calls, and so as to maximize end-user voice quality. Thus, in the deployment of a wireless communication system, the needs exist for reducing the cost of measuring system performance; reducing the cost of collecting performance data for reiterations and adjustments and for maximizing the use of this data; and for reducing the cost associated with tuning and retuning large base station antennas such as base station antenna 20 of FIG. 1, which essentially cover fixed areas and remain fixed until physically adjusted.

Typically, when establishing a wireless communication system or network, general criteria for establishing base station location and antenna configuration are determined. Then, these established base station antennas are tested and "tuned". Such an aspect of tuning is shown in prior art FIG. 2 for example. In such a system, the base station antenna 20, including three antenna components 20A, 20B and 20C, are set up in the initial "approximated" position for servicing cell area 10. Then tests are done by driving a wireless mobile unit around the coverage area of base station antenna 20, namely driving the wireless mobile unit around roads 40 in a car 50, for example. From these tests, signal measurements are made to determine gaps in the coverage area, etc. Once the appropriate measurements are made, then the antenna can then be physically adjusted to positions 20A', 20B'and 20C' as shown in prior art FIG. 2. As can be recognized, however, there are tremendous costs in collecting data by driving the wireless mobile unit around in a car 50; and there are even further costs in physically adjusting a base 20 station antenna 20, such as the cost of physically climbing a tower and physically adjusting the positions of the antenna components of base station antenna 20. Further, as roads do not exist throughout a cell, certain areas remain untested.

In establishing a wireless communication network, additional adjustments must be made for base station antennas 20 covering a plurality of cells over the entire wireless communication network region. As shown in prior art FIGS. 1 and 2 by the dash lines, each cell 10 includes neighboring cells, with each neighboring cell similarly including a base station antenna 20 with antenna components 20A, 20B, and 20C for handling traffic load within a neighboring cell. There are costs not only associated with establishing coverage areas and "tuning" base station antennas 20 in a neighboring cell, but there are also cell-to-cell costs including costs associated with "handing off" calls from one base station antenna 20 in one cell 10 to another base station antenna 20 in a neighboring cell. These costs include establishing neighbor lists, listing the neighboring cells to which calls may be handed off and from which calls may be received.

Due to the costs associated with neighboring cells, balances must be struck in tuning the base station antennas 20, so as to minimize interference among antennas without sacrificing areas of coverage. These objectives are traditionally realized by successively driving wireless mobile units in cars 50; comparing pilot signal information and flagging dropped calls; and adjusting neighbor sites. By performing manual antenna adjustments, however, network configurations are slowly established and not always accurate. Further, although adjustments among neighboring cells is possible using techniques such as up-tilt and down-tilt of antennas and by adjustment of the transmit power sent from the base station (the base band control rate or BCR), these processes are slow and often times neglected due to the manpower costs of climbing towers and physically adjusting antennas, and/or the costs associated with tower adjustment including interference and calls being dropped. Since attenuation of transmit power is easier than physically climbing a tower and adjusting up-tilt or down-tilt of antennas, power attenuation is often chose over up-tilting and down-tilting. However, attenuation in base station transmit power may potentially create a coverage hole where a wireless call may inadvertently be dropped or be unable to be connected. Thus, when such adjustments are made, this again increases costs. Accordingly, a need exists for establishing antenna configurations which maximizes coverage within a cell, and among several neighboring cells, and which minimizes interference.

SUMMARY OF THE INVENTION

A system and method have been developed wherein a cylindrical antenna array is configured and reconfigured in a wireless communication network. Position and signal information are monitored from wireless mobile units using the network with cylindrical antenna arrays in an initial configuration, and this information is used to determine reconfigurations of antenna components of the cylindrical antenna array to enhance performance of the system. As such, base station antennas can be dynamically configured to minimize such things as interference and dropped calls, and to maximize their voice quality both within a cell, and among neighboring cells.

BRIEF DESCRIPTION OF THE DRAWINGS

The present invention will become more fully understood from the detailed description given herein below and the accompanying drawings which are given by way of illustration only, and thus are not limitative of the present invention, wherein like reference numerals represent like elements and wherein.

DETAILED DESCRIPTION OF PREFERRED EMBODIMENTS

An antenna system and method of the present invention utilizes a cylindrical antenna array and reconfigures antenna components of the cylindrical antenna array based upon position and signal information (such as transmit power information, for example) of wireless mobile units so as to enhance performance of the cylindrical antenna array within sectors of a cell, and/or between the antennas of neighboring cell in a wireless communication system. By utilizing cylindrical antenna areas, antenna component configurations can be easily adjusted by a controller so as to fine tune the system to achieve such things as minimized interference and dropped calls, maximized signal coverage within a cell and between cells, as well as accurate neighbor sets for signal handoffs. As such, a wireless communication system includes cylindrical base station antenna arrays which are initially set up based upon mathematical parameters, and which can be easily adjusted or adapted in various ways so as to minimize interference and maximize coverage within a cell and between neighboring cells. A brief description of a cylindrical antenna array 100 for use in the antenna system and method of the present invention will now be described.

Figure 3:
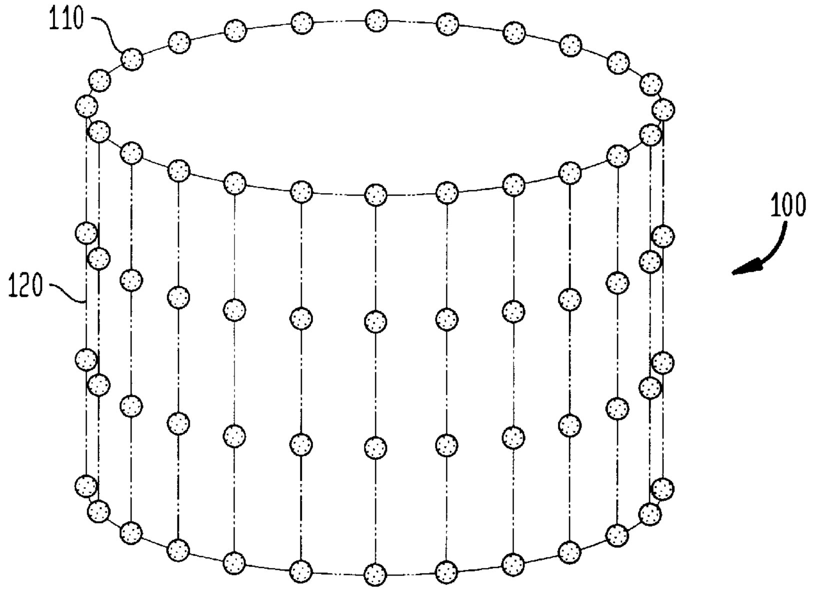
FIG. 3 is a depiction of a cylindrical antenna array.

FIG. 3 is an illustration of a cylindrical antenna array 100 for use in the antenna system and method of the present invention. The cylindrical antenna array is preferably a stack of circular arrays 110 (four of which are shown in FIG. 3, with four being shown for exemplary purposes only and thus which should not be considered limitative of the present invention). The circular arrays 110 provide flexible beam width and a steerable beam pattern. The vertical beam pattern 120 aspect of the cylindrical antenna array 100 provides steerable tilting capability such as down-tilting and up-tilting for example. By combining this functionality of the cylindrical antenna array with a dynamic control mechanism as will be discussed hereafter with regard to FIG. 4, antenna component configuration of the cylindrical antenna array 100 can varied to support dynamic down-tilting and up-tilting, to determine ideal azimuth and achieve dynamic azimuth rotation (change in beam orientation) and to achieve dynamic beam width adjustment (beam configuration adjustment). Further, the cylindrical antenna array 100 is controllable to vary antenna component configuration by adjusting the number of antenna components (from three to six for example), as well as the size, shape, etc., of their coverage areas.

The cylindrical antenna array 100 is programmable in a known manner to provide, for example, three antenna components covering three sectors of a cell 10 (similar to that of the antenna 20). Unlike "fixed" antenna structures which are difficult to adjust due to their size and location in tall antenna towers, the cylindrical antenna array 100 provides a flexible configuration of antenna components, wherein antenna pattern (beam configuration), orientations, etc., are variable through a remote unit (controller 200) to vary sector size covered by an antenna component. By combining the capabilities of the flexible configuration of the cylindrical antenna array 100 (as will be described in more detail with regards to FIGS. 5(*a*)–(*f*)) with dynamic control, initial near ideal antenna component configurations are established. Further, traffic loads within sectors of a cell, and/or among neighboring sectors or cells are dynamically distributed.

Figure 4:
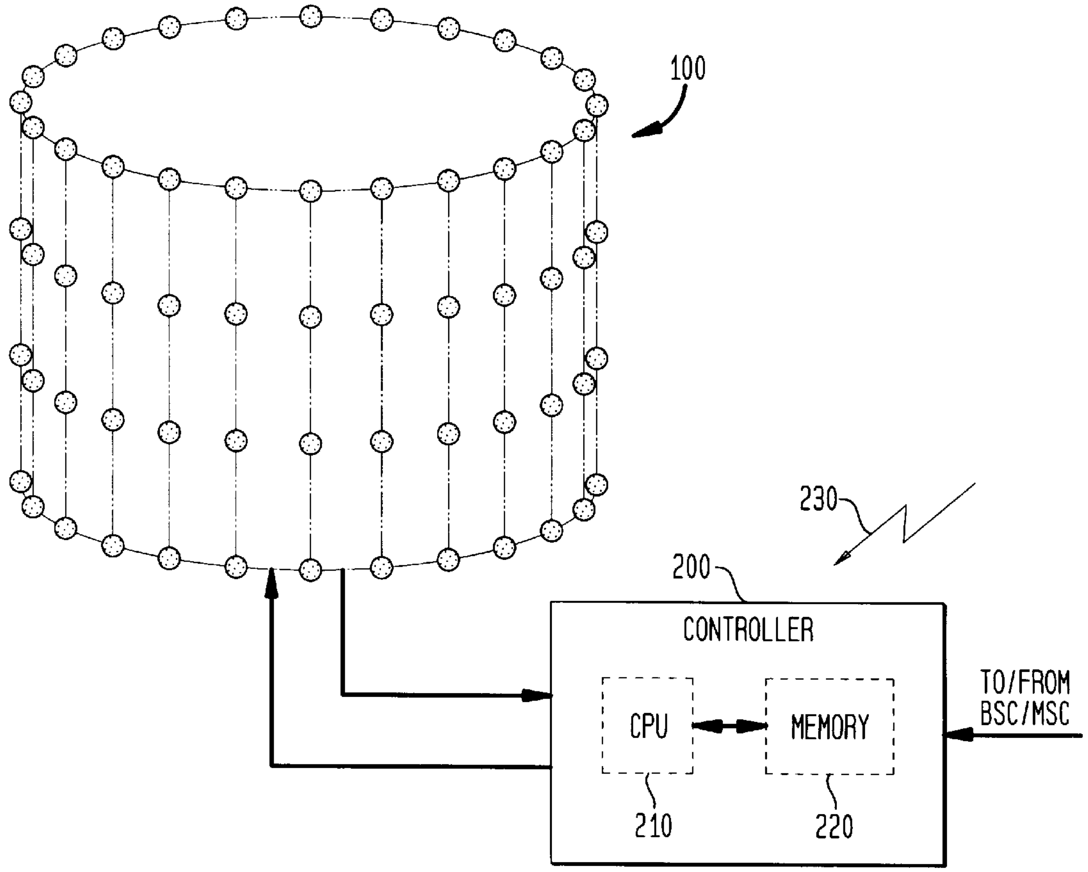
FIG. 4 is a depiction of an antenna system of the present invention.
Figure 5A:
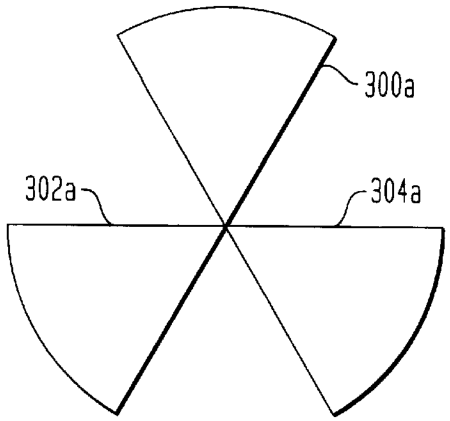
FIGS. 5*a*–5*f* are depictions of beam patterns or orientations and their variations.
Figure 5B:
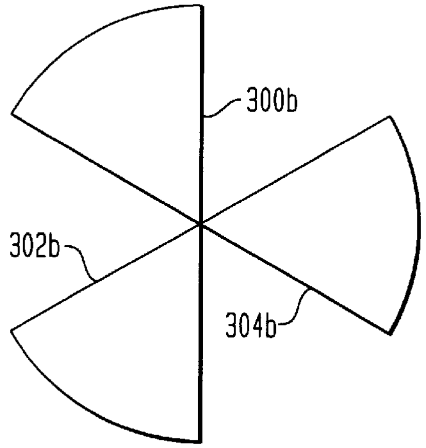
Figure 5C:
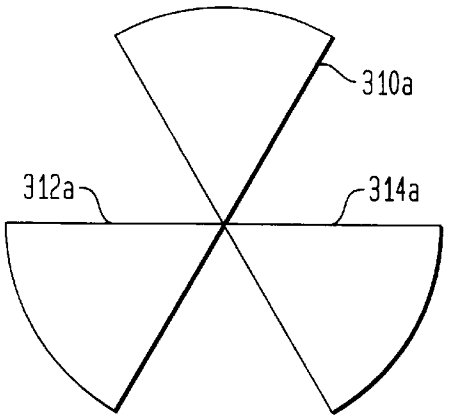
Figure 5D:
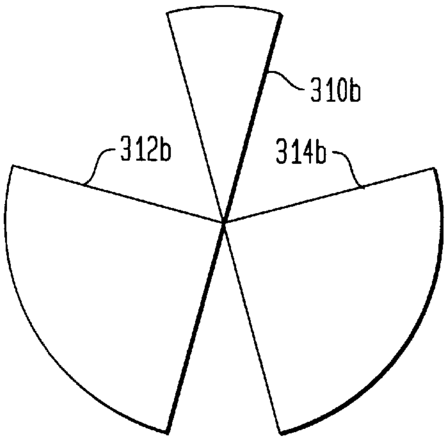
Figure 5E:
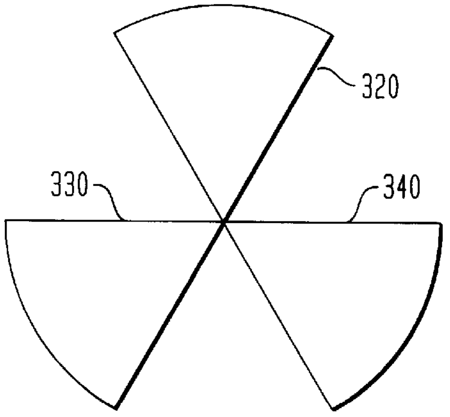
Figure 5F:
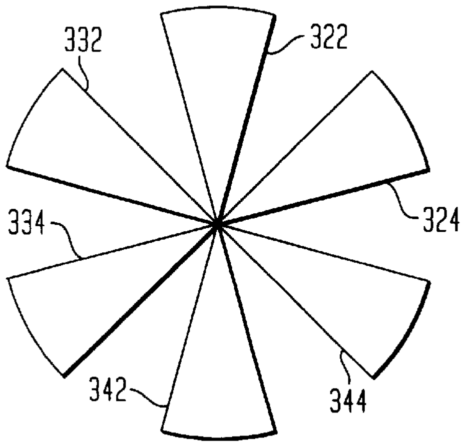

FIG. 4 is a depiction of the controller 200 configured to adjust the antenna components of cylindrical antenna array 100. Preferably, initial parameters for establishment of base station antennas in a wireless network are initially established in a known manner. As the base station antennas 20, cylindrical antenna arrays 100 are used. These cylindrical antenna arrays 100 are adjustable in a known manner through controller 200, which may be a base station controller (BTS), a controller associated with a plurality of base stations (BSC), or a controller located at a remote location such as a main switching center (MSC).

Once initially deployed, the cylindrical antenna arrays 100 can be reconfigured by controller 200 so as to maximize coverage areas and minimize interference within a cell and between neighboring cells. Based upon data gathered from wireless mobile units using the cylindrical antenna arrays 100, such as position and signal information (such as transmit power, for example) monitored and gathered at a remote location for example; the number of antenna components, antenna pattern and beam configuration, beam orientation, or even dynamic down-tilting and up-tilting are easily achieved by remotely controlling controller 200. As such, near; ideal azimuth angles of beam orientation are obtained, which was previously impractical in terms of cost and impossible during initial deployment due to prediction tools, in an automatic or semi-automatic manner without the need to climb high towers and move large antenna structures.

Cylindrical antenna array 100 is electronically steerable in vertical and horizontal directions. Preferably, the controller 200 includes a central processing unit (CPU) 210, and a memory 220. The CPU 210 receives information, such as information for reconfiguring antenna components, in a wireless manner through fixed signals 230 and/or through connections to other components which receive the position and signal information from the wireless mobile units, such as BSCs or MSCs. It should be noted that information can be received and processed in a manner to reconfigure antenna components of the cylindrical antenna array 100 at controller 200; at a BTS controller associated with controller 200; or at a remote location such as a BSC or MSC associated with controller 200.

In "tuning" or reconfiguring the antenna components of the cylindrical antenna array 100, neighbor sets are developed and stored in memory 220 of controller 200 or in another memory location, to ensure correct handoffs between cells. Measurements such as position and signal information from wireless mobile units is used to detect areas of call droppage and load on the antennas; and the antenna components of the cylindrical antenna array 100 are then dynamically adjusted or reconfigured to minimize interference without sacrificing coverage. The signal information received from the wireless mobile units can include pilot surveys, and any dropped calls that are flagged can result in adjustment of neighbor set handoffs between cells to ensure that such calls are not lost. Thus, these neighbor sets or neighbor lists are also adjusted using the received position and signal information to ensure adequate signal handoff among base stations.

Figure 1:
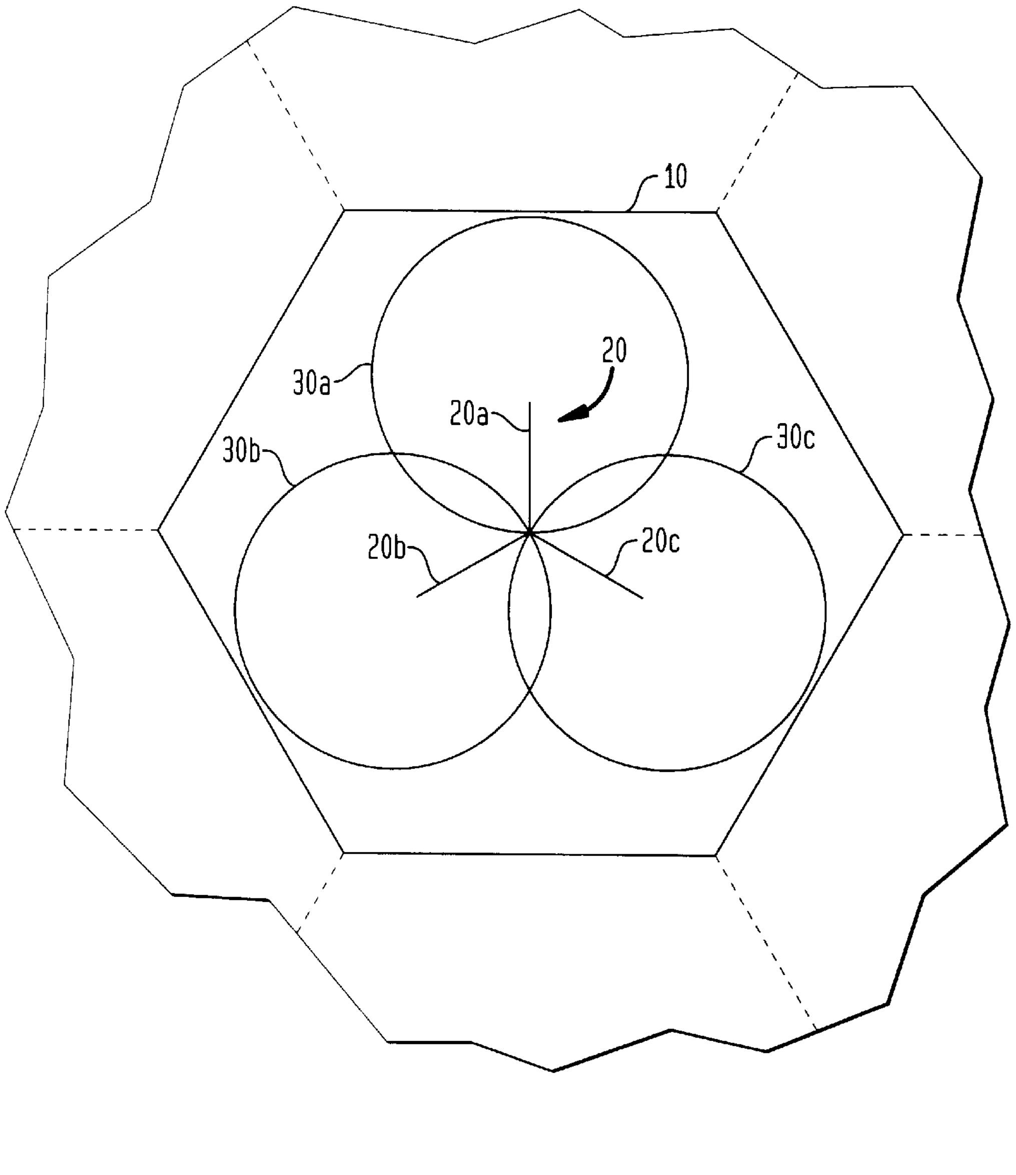
FIG. 1 (PRIOR ART)
FIG. 1 is a prior art illustration of a fixed antenna and its coverage area.
Figure 2:
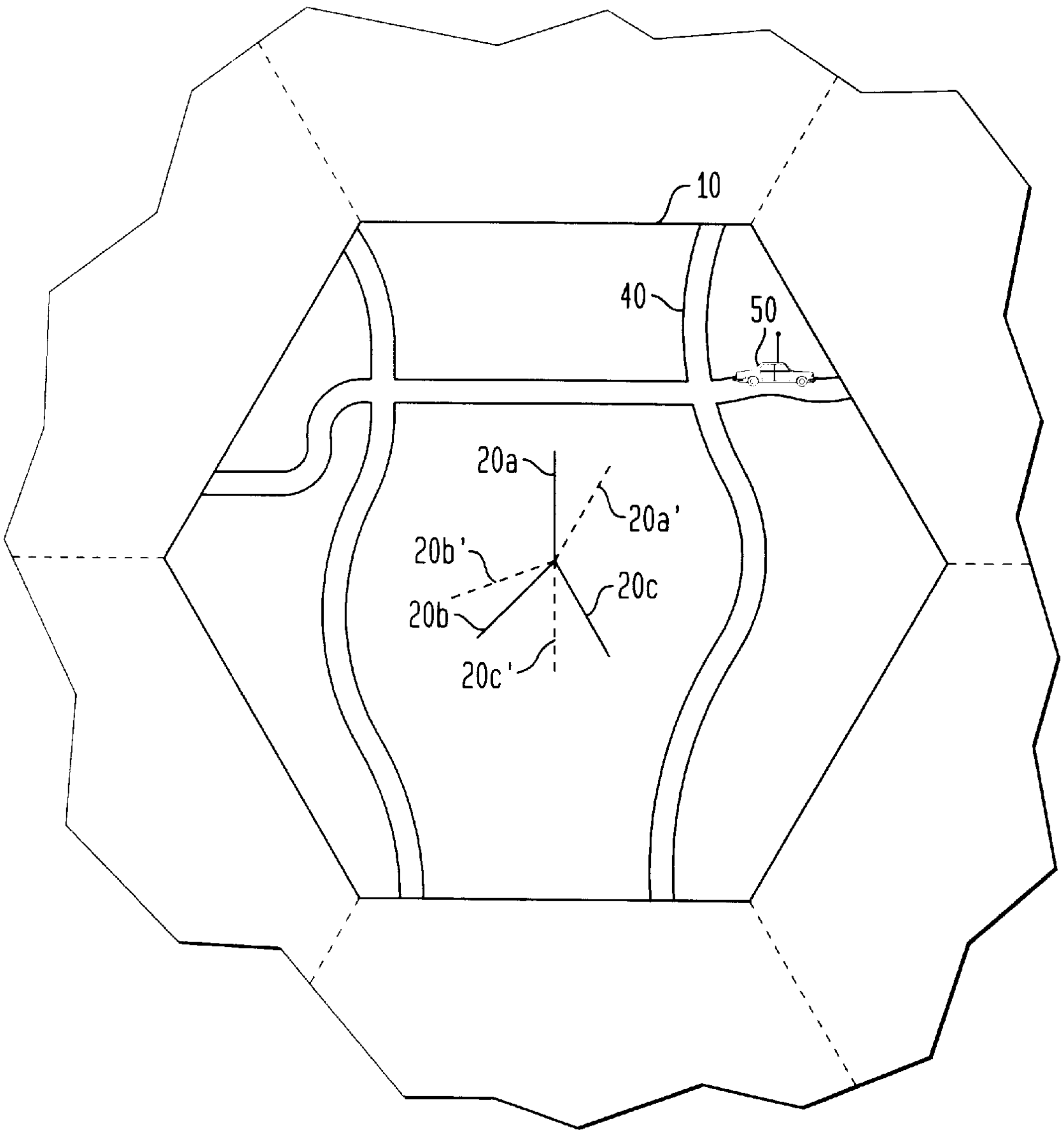
FIG. 2 (PRIOR ART)
FIG. 2 is a prior art illustration of a physical adjustment of an antenna.

One benefit of electronically steerable cylindrical antenna arrays 100 is the minimization of zones of interference, which are known as "pilot pollution" zones in the IS-95 context. Whether or not cell sites are placed in irregular patterns over rectangular or regular hexagonal grids as shown in FIGS. 1 and 2, the tri-sector or clover leaf azimuth pattern of cell site orientation provides lower system interference and minimization of pilot pollution. This is most beneficial when the azimuth angles of the antenna component are varied independently within a cell to minimize interference. Past path-loss prediction tools used for engineering in the deployment of wireless systems were not accurate enough to determine ideal azimuths prior to deployment in the "fixed" antenna environment. Once cell sites were deployed, it was impractical in terms of cost to change the azimuth angles and the opportunity was lost. However, utilizing the cylindrical array 100, which is electronically steerable in the vertical and horizontal directions, such costs are reduced, and ideal azimuth angles for each of the antenna components is preferably detected and varied where necessary.

In configuring a wireless communication network and various antennas and components for handling the network, sufficient initial deployment quality can be determined in a known manner without the need for driving wireless mobile units around the cell. This initial assessment of antenna deployment, while not perfect, is sufficient in connection with the system and method of the present invention due to the use of cylindrical antenna arrays 100 and controllers 200 as shown in FIG. 4. By providing the initial deployment of the base station antennas of the wireless network, including cylindrical antenna arrays 100 in a determinable, yet not ideal, configuration, friendly end users (wireless mobile users) can be allowed on the system. Once they are in the system, then information from the various wireless mobile units, including position and signal information from these wireless mobile units, is utilized to further tune the system. Of course, the initial configuration can be made to be fairly accurate, depending on the level of time and effort placed in the initial deployment. The key is that the initial deployment need not be as accurate as was necessary in the past with fixed antennas, since the cylindrical antenna array 100 is easily varied by varying antenna component patterns, beam configuration, orientation, tilt, etc., during reconfiguration operations, or thereafter based upon variations in determined loads. Further, the system uses its own initial wireless mobile units to "tune" the antennas, by detecting position and signal information as will be described hereafter.

Position information obtained from wireless mobile units is becoming more and more reliable. Some wireless mobile units include (or will include) global positioning systems (GPS) which allow nearly exact position information to be received. Other systems currently being used to detect location or position of wireless mobile units include assisted GPS systems, triangulation systems utilizing 1, 2, or 3 base stations, etc. How location or position of wireless mobile units is detected is not limitative of the present invention.

By providing such location or position information (or by allowing the detection of such information in a relatively easily manner) along with the signal information (such as signal strength, measurements, transmit power, etc.), antenna component configuration adjustment can be made to minimize interference and call droppage and maximize coverage. This position and signal for a given base station is preferably received and monitored in a location remote to a controller 200 of the base station. Using this information, antenna component configuration parameters for reconfiguring antenna components of a corresponding cylindrical antenna array 100 are determined. These determinations are made in a semi-automatic manner by a skilled operation, such as an RF engineer, following preset rules or guidelines; or in an automatic manner by a computer following preset or preprogrammed rules. The determinations are forwarded to a corresponding controller 200 which controls antenna component configuration adjustment of a corresponding cylindrical antenna array 100.

Basically, once the position of the wireless mobile unit is pinpointed, and signal measurements (strength) are determined, interference and coverage area problems within the cell or among neighboring cells are determined, and adjustments to antenna components of the cylindrical antenna array 100 are made. Thereby, interference is minimized and coverage areas are maximized so that calls are not dropped, calls on the wireless mobile unit remain clear, and new calls are received. Examples of rules, used by a skilled operator or a computer receiving the positional signal information to determine antenna component parameter reconfigurations, are as follows.

Hereafter, various methods of reconfiguring of the number of antenna components, the antenna pattern or beam configuration, orientation and up and down tilting between cells based upon the position and signal location of the wireless mobile units and/or received load information, will be described. In essence, the data, including position and signal information from the wireless mobile units, is used to provide maps of the system performance from end-user traffic to a computer or skilled RF engineer and such maps of performance metrics are used together with the steerable or reconfigurable qualities of the antenna components of the cylindrical antenna array 100 to tune and reconfigure a system from remote locations. Once antenna component reconfiguration parameters are determined, they are sent to the appropriate controller 200, which controls reconfiguration of a corresponding cylindrical array 100. Similarly, neighbor set tuning is done utilizing such maps, or via automatic neighbor list adaption. Hereafter, reconfiguring of the antenna component of the cylindrical antenna array 100 will be discussed based upon varying antenna loads being detected, but such discussion is equally applicable to the reconfiguring of the cylindrical antenna array based upon position and signal information received by controller 200.

The controller 200 not only has the capability of initially configuring and/or reconfiguring the cylindrical antenna array 100 by setting the number of antenna components (such as three or six for example), as well as an antenna pattern or beam configuration, and orientation (similar to that shown in FIG. 5 *a–f* or in any designated three, six, etc., sector pattern with a different beam or antenna pattern orientation) based on position and signal information received (such as signal transmit/receive power), but also has the function of determining a load on the cylindrical antenna array. The load can be determined by controller 200 which may be a base station (BTS) controller; a controller associated with a plurality of base stations (BSC), or a controller located at a central switching station (MSC), as will be explained hereafter. Thus, the controller 200 can also be used to adjust or dynamically reconfigure antenna component configuration such as the number of antenna components, beam configuration, tilt and/or orientation, during operation of the system (after initial configuration) in a dynamic manner based upon reconfiguration parameters determined from position and signal information or based upon variations in the determined loads. More preferably, the load for each of the designated antenna components of the cylindrical array 100 established at any given time (such as those initially established for example) can be determined, and used, automatically or by an RF engineer based upon pre-defined rules, to determine antenna component reconfiguration parameters. The parameters are then sent to controller 200 for dynamically adjusting or reconfigure antenna components configuration and orientation of the cylindrical antenna array components so as to thereby distribute load more evenly among cell sectors or between cells, based upon the determined load. This will be described using examples for antenna array component variations based on load in more detail as follows, but all such examples discussed using load are equally applicable using other parameters such as received position and signal information.

In wireless technology, and more preferably in cellular/PCS systems, one or more cylindrical antenna arrays 100 are used to cover areas of a cell by configuring the cylindrical antenna array 100 into, for example, three antenna components, each with a beam pattern or configuration, tilt and orientation. To fully take advantage of the large capacity and essentially soft limit provided to wireless systems by CDMA technology for example, the load on each of the antenna components of the cell is monitored. As the traffic in a particular sector of the cell gets relatively heavily loaded, antenna component reconfiguration parameters are determined and sent to the controller 200 which controls adjustment of antenna component configuration. For example, the controller 200 controls the cylindrical antenna array 100 to adjust beam configuration for example, by narrowing beam width of one antenna component of the cylindrical array 100 and widening beam width of another antenna component within the same cell. This reduces the load of one antenna component within the cell and increases the load of another antenna component so as to more evenly distribute the load on the traffic cylindrical antenna array 100 despite the relative increase in traffic load of one sector of a cell as compared to another sector of the cell.

As previously stated, load can be determined at any remote location such as a BTS (associated with a single base station and a plurality of sectors within a cell), a BSC (associated with a plurality of base stations and thus a plurality of neighboring cells), or in a central place, such as at an MSC, for example (which is again associated with a plurality of base stations and a plurality of cells). One example of load detection, within sectors of a cell or across adjacent cells, involves monitoring of the ratio of pilot power to total transmit power. Pilot power is defined in CDMA technology, for example, as an uncoded channel which is unique to a sector, and is normally fixed. The total transmit power is variable and equates to the pilot power within a sector added to the power supplied by the users of wireless mobile units (mobile phones) within the sector. In certain instances, power associated with the wireless mobiles units will vary based on needs to increase power to maintain signal reception, etc., such that the farther a wireless mobile unit moves from a base station, the more total transmit power is necessary to maintain the signal.

The ratio of pilot power to total transmit power can not go below a fixed value, such as ten percent, for example. Thus, in the past, power adjustments had to be made at multiple threshold levels so that when the ratio was at fifteen percent, for example, transmit power was reduced at some instances; and when the ratio reached ten percent, the base station no longer received any incoming calls. Such aspects of power reduction and removing the capability to receive incoming calls need not initially take place in the present system, however, wherein, at various adjustable pilot power to total transmit power threshold percentage levels, adjustments of antenna components of cylindrical antenna array 100 take place to shift load.

More preferably, as the ratio of pilot power to total transmit power is determined to approach various selectable threshold levels (which can be set at 15% or 10%, for example), the antenna components of the cylindrical antenna array 100 are controlled by a controller 200 in any number of various ways so as to redistribute the load. This includes adjusting beam configuration, angle, sector patterns, etc., so as to increase the ratio of pilot power to total transmit power within the sector or cell, thereby distributing the load among the sectors within the cell (or between cells). Accordingly, if the load is particularly heavy in one sector, instead of preventing the ratio from decreasing by refusing to accept any new incoming calls in that sector due to the unusually heavy load, beam adjustment, for example, takes place wherein a beam configuration is narrowed within a heavy loaded sector and increased within a lightly loaded sector so as to redistribute the load within the sector. This detection of pilot power, transmit power and ratios of pilot power to transmit power within sectors of the cell and among cells is done in a known fashion; but instead of dropping calls and refusing to take new calls to adjust the ratio, reconfiguration parameters are determined and the cylindrical antenna array 100 is adjusted by controller 200 varying beam configuration, etc., within the cell thereby dynamically redistribute the load.

Similarly, load is distributable among cells. For example, a BSC controller (such as 250 of FIG. 6) is connected to controllers 200 of neighboring cells and/or controls cylindrical antenna arrays 100 of neighboring cells. Power ratio values for ratios of pilot power to total transmit power for the neighboring cells are received and added up and/or compared so as to determine whether or not the load is particularly heavy in one cell and particularly light in another cell. In such a case, the BSC 250 initiates (or controls the controllers 200) a beam tilting operation as will be further discussed with regard to FIG. 6, for example, wherein the beam pattern of one cylindrical antenna array 100 is tilted up and the beam pattern of another cylindrical antenna array is tilted down so as to relatively increase the traffic load in one cell and relatively decrease the traffic load in another cell. The aspects of using different ways to adjust or redistribute traffic load among cell sectors or between cells will be explained hereafter in more detail. It should be noted, however, that although the use of the pilot power to total transmit power ratio as a threshold for triggering load redistribution is preferred, other characteristics representative of detected loads can also be used, and are encompassed within the scope of the present invention.

This redistribution of load among cell sectors (or between cells) is important because traffic load within a cell continuously varies over the course of a day, a week, a month, a year, etc. In the real world, traffic load distributions are extremely non-uniform and time varying. For example, one sector (or cell) may support a lot of traffic and thus bear a heavy load during the morning hours, and bear less of a load in the afternoon (due to rush hour to and from work causing different sectors of a cell to be heavy/light in the morning and light/heavy in the afternoon, for example), with the heavy traffic shifting to the other sector during the afternoon.

By monitoring these trends over time and determining that the load in one sector is extremely heavy at any given time, and by determining adjustments for antenna component configuration of the cylindrical antenna array 100 in that sector (lessening its load) and in another sector (making it absorb more load), the antenna component of the lightly loaded sector can handle a portion of the load so that no sector becomes overloaded. As such, requests to establish new calls do not get rejected and calls do not get dropped. Narrowing the beam width of an antenna component of a heavily loaded sector while widening the beam width of the antenna component of a lightly loaded sector, as one way of adjusting beam component configuration, distributes the traffic from the heavily loaded sector to the lightly loaded sector.

FIGS. 5(*a*)–5(*f*) show various exemplary ways to adjust beam component configuration of the antenna components of the cylindrical antenna array 100. FIG. 5(*a*) illustrates an example of a simple beam configuration of a cylindrical antenna array 100 configured with three antenna components, each of a similar beam pattern and orientation. The traffic load on each of the three antenna components 300A, 302A and 304A is then determined. If it is determined that the load of one or more antenna components is relatively heavier than the others, one way to dynamically adjust the load is to shift or rotate the azimuth angle orientation of the antenna components so as to essentially shift or rotate the beam pattern itself. As such, a first antenna component initially covers the area designated by 300A as shown in FIG. 5(*a*), and is then adjusted to cover the area shown by element 300B in FIG. 5(*b*). Similarly, the beam pattern 302A is adjusted in orientation to cover the area 302B; and the beam pattern 304A is adjusted in orientation to cover the area 304B. In essence, instead of the area of heavy traffic being handled by one antenna component 300A as shown in FIG. 5(*a*), it can be shared by azimuth rotation to be handled between two antenna components covering areas 300B and 304B as shown in FIG. 5(*b*) for example.

Another way to dynamically share or spread the traffic load is shown utilizing FIGS. 5(*c*) and 5(*d*). This method utilizes adjusting the beam configuration or beam width of the beam patterns of the antenna components of the cylindrical antenna array 100. FIG. 5(*c*) illustrates three antenna components of equal beam width, 310A, 312A and 314A. If one of the aforementioned beam patterns or sectors becomes heavily loaded, the beam width of that sector can be narrowed and the beam width of lightly loaded sector(s) can be widened to distribute the traffic from the heavily loaded sector to the lightly loaded sector. For example, if the sector designated by 310A of FIG. 5(*c*) is heavily loaded and the sectors of 312A and 314A are lightly loaded, then the controller 200 is controlled to adjust the beam configuration of the three antenna components so as to narrow the beam width of the sector 310A as shown by element 310B in FIG. 5(*d*), and widen the beam width of sectors 312A and 314A, as shown by elements 312B and 314B of FIG. 5(*d*).

Yet, another way to vary the antenna component configuration of the cylindrical antenna array 100 is to adjust the antenna component number. As a wireless system grows, more and more users are added to the system. One way to handle increased volume of traffic is to replace a three-sector antenna with a six-sector antenna. Using cylindrical array 100, no extra hardware and installation need take place. Assuming controller 200 initially configured the cylindrical array antenna 100 to have three components 320, 330 and 340 as shown in FIG. 5(*e*), once volume increases such that six sectors are necessary to handle the traffic, the controller 200 is then controlled to reconfigure the cylindrical antenna array 100 into a six sector configuration as shown by elements 322, 324, 344, 342, 332 and 334 of FIG. 5(*f*). This is another way that the controller 200, based upon a determined load on the cylindrical antenna array 100, is controlled to adjust the antenna component configuration of the cylindrical antenna array. It should be noted that the above described methods of varying antenna component configuration are exemplary and not limitative of the invention, and are included as alternate methods of load adjustment for all aspects of the invention previously described.

Figure 6:
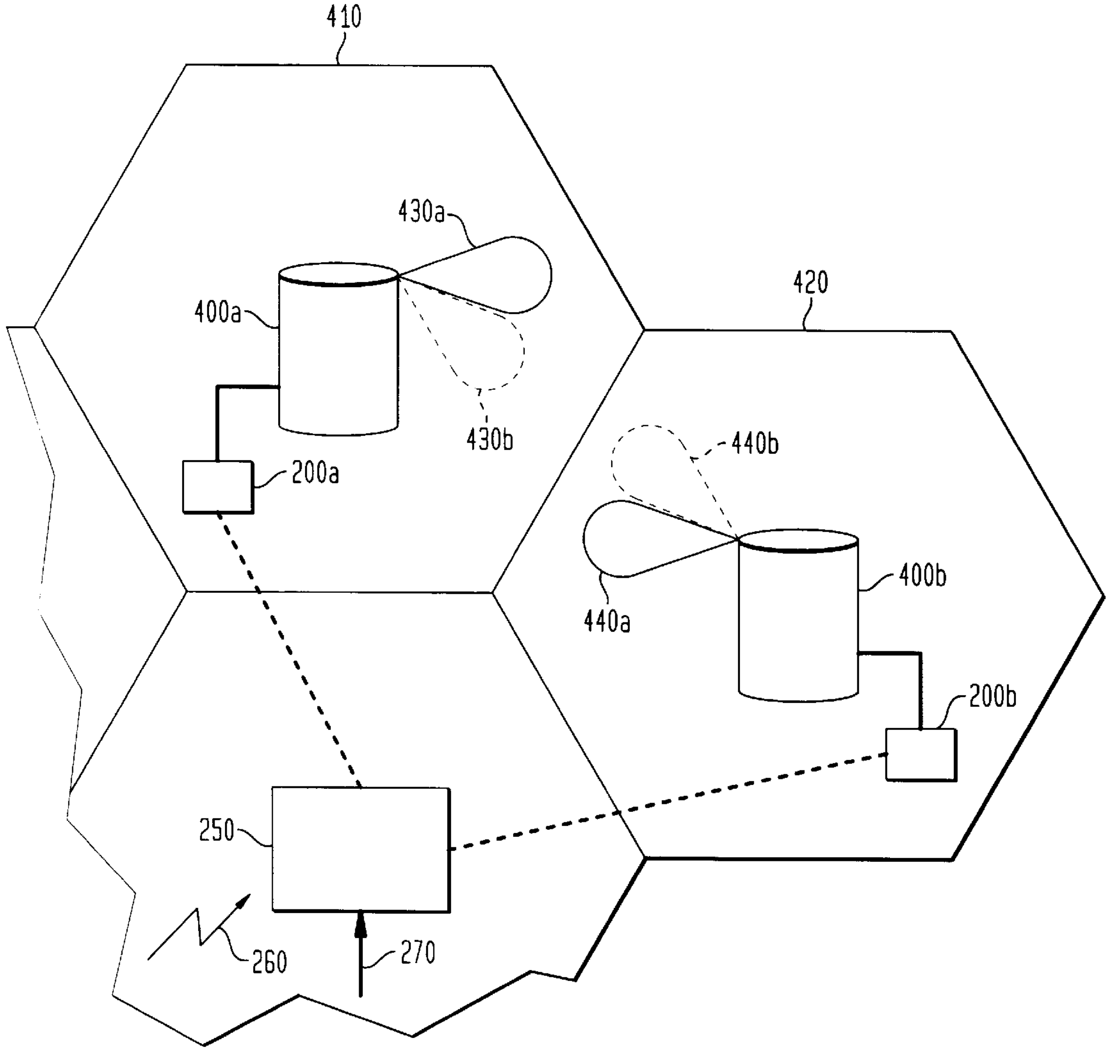
FIG. 6 is an illustration of beam tilting to affect neighboring cells.

Another aspect of the system and method of the present invention is shown in FIG. 6. In this preferred embodiment of the present invention, the antenna system and method is used to distribute traffic between cells, such as cells 410 and 420 shown in FIG. 6. In some cases, one cell may become heavily loaded while neighboring cells are lightly loaded. This can occur at various times of the day, week, month, year, etc., and can be monitored by receiving pilot power/total transmit power ratios of wireless mobile units using neighboring cells 410 and 420. Similarly, position and signal information (data)/or control information control (control) can be received from the wireless mobile units, component reconfigurations determined, and control information sent in wireless form (signal 260) or directly from other locations (signal 270) for receipt by BSC 250 (or individually by controllers 200A and 200B). For example, during morning rush hour, cell 410 could be monitored as having a relatively heavy traffic load, while during evening rush hour, cell 420 could be monitored as having a relatively heavy traffic load. In such a situation it is desirable to distribute traffic load between cells. In this preferred embodiment, the antenna system and method of the present invention achieve such a result.

As previously described, the vertical array aspect of the cylindrical antenna array 100 provides steering tilting capability. Initially, the cylindrical antenna array 400A may be programmed by controller 200A to be sectored into three antenna components each covering three sectors (for example) of a cell such as that shown in FIG. 5(*a*), 5(*c*) and 5(*e*) for example. The beam 430A of FIG. 6 illustrates a beam configuration of one such antenna component of the cylindrical antenna array 400A (the beam configuration of the other two antenna components not being shown for the sake of clarity). Similarly, another cylindrical antenna array 400B exists in a neighboring cell 420, which also includes a beam configuration of an antenna component 440A with only one of the antenna components being shown in FIG. 6 for the sake of clarity.

The first cylindrical antenna array 400A in the first cell 410 is controlled by controller 200A with the second cylindrical antenna array 400B being controlled by controller 200B in a neighboring cell 420. Upon receiving information indicating that the traffic in a cell is relatively heavy, a load distribution between neighboring cells is determined, and reconfiguration parameters among neighboring cells is determined at a remote location in an automatic or semi-automatic manner based on preset rules, in a manner similar to that previously described regarding within cell reconfiguration. Once reconfiguration parameters among neighboring cells are determined, the BSC controller 250 receives such information for instructing controller 200A to control the vertical components of the cylindrical antenna array 400A so as to down tilt the heavily loaded antenna component 430A of the heavily loaded cell (such as cell 410 for example), to essentially adjust the antenna component configuration to cover the area 430B as shown in cell 210. Similarly, the BSC controller 250 instructs controller 200B to control the configuration of antenna component 440A to be up-tilted to cover the area 440B in cell 420 of FIG. 6, for example. Of course, the instruction information need not pass through BSC 250, and may be sent directly to each of controller 200A and 200B.

The up-tilting of the lightly loaded cell and the down-tilting of the heavily loaded cell shrinks the coverage of the heavily loaded cell and expands the coverage of the lightly loaded cell. The cylindrical antenna array 400B thus bears a relatively increased load and the cylindrical antenna 400A thus bears a slightly lesser load so that load is distributed between neighboring cells 410 and 420. This can be determined based upon received position and signal information, or thereafter. As such, traffic in heavily loaded cells is reduced and is assigned to lightly loaded neighbor cells in real time.

It should be noted that the above described specific examples are merely exemplary of the overall invention. For example, the examples involve a single cylindrical antenna array sectored into a multiple components (three for example) to cover areas of a cell. Instead of sectoring the cylindrical antenna array into components, separate cylindrical antenna arrays could be used. Further, with regard to dynamic load sharing between neighboring cells, although dynamic load sharing between only two cells has been described, one of ordinary skill would understand that the present invention encompasses such dynamic load sharing between three or more neighboring cells. Further, although down-tilting of one antenna component of one cylindrical antenna array and up-tilting of one antenna component of another cylindrical antenna array has been described, the invention also encompasses more than one antenna component of one or both arrays. It further includes up-tilting and down-tilting of different antenna components of the same cylindrical antenna array and all variations and permutations thereof regarding multiple antenna components of cylindrical arrays of neighboring cells. Also, although load detection has been described using transmit power, other ways of determining load are also encompassed within the present invention.

The inventions being thus described, it will be apparent that the same may be varied in many ways. Such variations are not to be regarded as a departure from the spirit and scope of the invention, and all such modifications as would be obvious to one skilled in the art are intended to be included within the scope of the following claims.

What is claimed is:

1. An antenna system comprising:

a cylindrical antenna array including a plurality of antenna components of an initial configuration; and a controller, adapted to reconfigure antenna components of the cylindrical antenna array based upon position and signal information of wireless mobile units using the cylindrical antenna array, so as to enhance performance of the cylindrical antenna array in a wireless communication system.

2. The antenna system of claim 1, wherein the controller reconfigures at least two antenna components of the cylindrical antenna array by adjusting beam configuration.

3. The antenna system of claim 2, wherein the controller adjusts beam configuration by relatively narrowing beam width of one antenna component of the cylindrical antenna array and by relatively widening beam width of another antenna component of the cylindrical antenna array.

4. The antenna system of claim 1, wherein the controller reconfigures at least two antenna components of the cylindrical antenna array by adjusting beam orientation.

5. The antenna system of claim 4, wherein the controller adjusts beam orientation by changing the azimuth angle of at least two antenna components of the cylindrical antenna array.

6. The antenna system of claim 1, wherein the controller reconfigures the cylindrical antenna array by varying the number of antenna components of the cylindrical antenna array.

7. The antenna system of claim 1, wherein a load on the antenna components of the cylindrical antenna array is determined, and the controller further adjusts antenna component configuration based upon the determined load.

8. The antenna system of claim 7, wherein the controller adjusts beam configuration of the antenna components by relatively narrowing beam width of at least one cylindrical antenna array component upon the determined load being relatively heavy and adjusts beam configuration by relatively widening beam width of at least one other cylindrical antenna array component upon the determined load being relatively light.

9. The antenna system of claim 7, wherein the controller reconfigures at least two antenna components of the cylindrical antenna array by adjusting beam configuration.

10. The antenna system of claim 7, wherein the controller adjusts beam orientation by changing the azimuth angle of at least two antenna components of the cylindrical antenna array.

11. The antenna system of claim 7, wherein the controller adjusts the number of antenna components of the cylindrical antenna array based on the determined load.

12. The antenna system of claim 7, wherein the load is determined based on a ratio of pilot power to total transmit power.

13. The antenna system of claim 7, wherein the controller adjusts at least two cylindrical antenna arrays serving neighboring cells.

14. The antenna system of claim 13, wherein the controller adjusts beam orientation by down-tilting the beam of an antenna component of at least one cylindrical antenna array in a first cell upon its determined load being relatively heavy and a second controller adjusts beam orientation by up-tilting the beam of at least one antenna components of a cylindrical antenna array in a neighboring cell upon its determined load being relatively light.

15. The antenna system of claim 7, wherein a first controller adjusts antenna component configuration of a first cylindrical antenna array in a first cell and a second controller adjusts antenna component configuration of a second cylindrical antenna array in a second cell, each of the first and second controller being operatively connected to a third controller.

16. The antenna system of claim 1, wherein the position and signal information from a wireless mobile units is remotely received and used to determine reconfigurations of the antenna components, the controller being remotely controlled to reconfigure the antenna components of the cylindrical antenna array.

17. The antenna system of claim 16, wherein the reconfiguration determination is automatic, based upon the remotely received position and signal information.

18. The antenna system of claim 16, wherein the reconfiguration determination is semi-automatic, based upon the remotely received position and signal information.

19. The antenna system of claim 1, wherein the position and signal information are used to adjust neighbor lists to enhance signal handoff.

20. A method of reconfiguring antenna components in a wireless communicationsystem, comprising:

providing a cylindrical antenna array including a plurality of antenna components of an initial configuration;

reconfiguring antenna components of the cylindrical antenna array based upon the position and signal information of wireless mobile units using the cylindrical antenna array, so as to enhance performance of the cylindrical antenna array in a wireless communication system.

21. The method of claim 20, wherein the step of reconfiguring includes:

reconfiguring at least two antenna components of the cylindrical antenna array by adjusting beam configuration.

22. The method of claim 21, wherein the step of reconfiguring includes:

adjusting beam configuration by relatively narrowing beam width of one antenna component of the cylindrical antenna array, and adjusting beam width configuration by relatively widening beam width of another antenna component of the cylindrical antenna array.

23. The method of claim 20, wherein the step of reconfiguring includes:

reconfiguring at least two antenna components of the cylindrical antenna array by adjusting beam orientation.

24. The method of claim 23, wherein the step of reconfiguring includes:

adjusting beam orientation by changing the azimuth angle of at least two antenna components the cylindrical antenna array.

25. The method of claim 20, wherein the step of reconfiguring includes:

reconfiguring the cylindrical antenna array by varying the number of antenna components of the cylindrical antenna array.

26. The method of claim 20, further comprising the step of:

adjusting neighbor lists of the cylindrical antenna array to enhance signal handoff, based upon the position and signal information.

27. The method of claim 20, further comprising:

determining a load on the antenna components of the cylindrical antenna array; and adjusting antenna component configuration based on the determined load.

28. The method of claim 27, wherein beam configuration of at least one antenna component of the cylindrical antenna array is relatively narrowed upon its determined load being relatively heavy and beam configuration of at least one antenna component of the cylindrical antenna array is relatively widened upon its determined load being relatively light.

29. The method of claim 27, wherein the step of determining includes determining a load of a plurality of cylindrical antenna arrays in neighboring cells, and wherein the step of adjusting includes adjusting an antenna component of each of the plurality of the cylindrical antenna arrays in neighboring cells.

30. The method of claim 29, wherein the step of adjusting includes down-tilting a beam of at least one antenna component of at least one cylindrical antenna array in one cell upon its determined load being relatively heavy and up-tilting a beam of at least one antenna component of at least one other cylindrical antenna array in a neighboring cell upon its determined load being relatively light.

31. The method of claim 27, wherein the load is determined based on a ratio of pilot power to total transmit power.

32. A method of enhancing signal reception in a wireless network, comprising:

providing at least one base station antenna for the wireless network, wherein the antenna is a cylindrical antenna array including a plurality of antenna components of an initial configuration;

monitoring signal and position information received from wireless mobile units using the wireless network; and determining antenna component configuration parameters, based upon the received position and signal information, for reconfiguring the antenna components of the cylindrical antenna array to enhance signal reception.

33. The method of claim 32, wherein a plurality of the base station antennas are provided, each including cylindrical antenna arrays, and wherein antenna component parameters of antenna components of each of the cylindrical antenna arrays are determined based upon the received position and signal information.

34. The method of claim 33, wherein a controller receives the determined antenna component configuration parameters and reconfigures the antenna components.

35. The method of claim 34, wherein a separate controller is associated with each cylindrical antenna array, for controlling reconfiguring of antenna components.

36. The method of claim 32, wherein antenna component configuration parameters are determined for adjusting beam configuration of the antenna components of the cylindrical antenna array.

37. The method of claim 32, wherein antenna component configuration parameters are determined for adjusting the azimuth angle of the antenna components of the cylindrical antenna array.

38. The method of claim 32, wherein antenna component configuration parameters are determined for reconfiguring the number of antenna components of the cylindrical antenna array.

39. The method of claim 33, wherein antenna component configuration parameters are determined for adjusting beam configuration of the antenna components of the cylindrical antenna array.

40. The method of claim 33, wherein antenna component configuration parameters are determined for adjusting the azimuth angle of the antenna components of the cylindrical antenna array.

41. The method of claim 33, wherein antenna component configuration parameters are determined for reconfiguring the number of antenna components of the cylindrical antenna array.

* * * * *